United States Patent Office 3,172,856
Patented Mar. 9, 1965

3,172,856
COPOLYMERS OF N-ALKYL PIPERAZINE ACRYLATE AND ALKYL ACRYLATE AND LUBRICATING OILS CONTAINING THEM
Elwin B. Ovist, Olympia Fields, Ill., and Manley Kjonaas, Hammond, Ind., assignors to Sinclair Research, Inc., New York, N.Y., a corporation of Delaware
No Drawing. Filed Sept. 14, 1961, Ser. No. 137,988
10 Claims. (Cl. 252—51.5)

This invention relates to new polymeric products. More particularly, the invention concerns a new class of oil-soluble nitrogen-containing copolymers which are useful, for instance, as dispersants and sludge inhibitors in lubricating oils, especially those oils designed for use in low temperature applications.

A major problem in the operation of both spark ignition and diesel engines results from the tendency of lubricating oils such as crankcase oils to undergo oxidation and other chemical changes that lead to the formation of carbon, resins, and insoluble varnish-like gums that deposit on moving engine parts and separate as sludge that markedly impairs the lubricating properties of the oil. Deposition of sludge on piston surfaces and rings is particularly damaging.

Many materials have been added to lubricating oils as dispersants and sludge inhibitors among which are the nitrogenous vinyl ester copolymers. Reactant ratios, however, of the nitrogenous vinyl monomer and the oil solubilizing vinyl monomer reacted to produce these copolymers, are oftentimes limited by the tendency of the nitrogenous monomer to render the copolymer insoluble in mineral oil. This limits the desirable basicity that can be built into the copolymer which in turn limits the effectiveness with which the copolymer can function as a dispersant and organic sludge inhibitor in lubricating oils.

We have found that oil-soluble copolymers prepared from esters of an acrylic acid and a long-chain aliphatic alcohol, and an N-alkyl piperazine ester of an acrylic acid, the mol ratio of the acrylic acid ester to the N-alkyl piperazine ester in said polymer being about 75:25 to 99:1, preferably 93:7 to 99:1, are more effective dispersants and sludge inhibitors when added in minor amounts to mineral oils of lubricating viscosity than those prepared from other monomers. Since the two-tertiary nitrogen-containing vinyl monomer of the present invention, i.e. the N-alkyl piperazine ester, may cause the copolymers to be insoluble in the oil unless it is used in the copolymerization in relatively low proportions, for instance, in a mol ratio of acrylic acid ester to nitrogen-containing monomer of 93:7 to 99:1, it is preferred to conduct the copolymerization in the presence of an alkanal of 2–20 carbon atoms. We have also found that conducting the copolymerization in the presence of an alkanal of 2–20 carbon atoms, especially when the mol ratio of acrylic acid ester to N-alkyl piperazine ester is about 75:25 to 92:8, proportions which generally produce an oil-insoluble product, results in a copolymer that is oil-dispersible and a highly-effective dispersant and sludge inhibitor.

The alkyl group of the N-alkyl piperazine ester of an acrylic acid used in making the novel copolymers of the present invention is a lower alkyl group, that is, containing 1 to 5 carbon atoms. The esters may be prepared by any method known to the art, for example, by reacting a hydroxyalkyl piperazine with an acrylic acid. Suitable acrylic acids include, for instance, acrylic acid, alpha-substituted acrylic acids such as methacrylic acid, ethacrylic acid, alpha-cyclohexyl acrylic acid and chloroacrylic acid. The preferred ester is N-alkyl piperazine methacrylate.

The monomers to be copolymerized with the N-alkyl piperazine ester include the esters of the acrylic acids mentioned above and the long chain aliphatic alcohols, preferably alkanols, of about 10 to 20 carbon atoms, preferably about 12 to 18 carbon atoms. Suitable long chain alcohols used in the esterification are, for example, decyl, lauryl, cetyl, stearyl, eicosanyl, nondecanyl and the like alcohols and mixtures thereof. Examples of acrylic acid esters used in making the copolymers include, among others, decyl acrylate, lauryl acrylate, stearyl acrylate, decyl methacrylate, lauryl methacrylate, cetyl methacrylate, stearyl methacrylate, eicosanyl acrylate, docosanyl acrylate and the like.

The alkanal in whose presence the copolymerization is conducted contains 2 to 20 carbon atoms, preferably 4 to 10 carbon atoms. The aldehyde may be straight chain, branched chain, saturated or unsaturated and can be substituted with non-interfering groups. The preferred aldehyde is the alkyl aldehyde. The concentration of the aldehyde employed in preparing the novel copolymers of the present invention can range from about 0.5 to 10% by weight, preferably about 1 to 5% by weight.

The copolymers can be prepared by conventional bulk, solution or dispersion polymerization methods involving known polymerization initiators. Polymerization initiators particularly suited for use in preparing the copolymers include various free-radical yielding catalysts as peroxide catalysts such as benzoyl peroxide, lauroyl peroxide, tertiary butyl peroxide, 2,2-bis(tertiary butyl peroxy) butane, di(tertiary butyl) peroxide, tertiary butyl perlargonate, hydrogen peroxide, sodium or potassium persulfate, percarbonate, peracetic acid and the like. Other suitable catalysts include sodium bisulfite, diethylsulfoxide, azo compounds such as alpha, alpha-azodiisobutyrylonitrile and the like. The amount of the initiator added may vary over a considerable range. In general, the amount of initiator added will vary from about 0.1% to 5% by weight of the materials being polymerized. The temperature selected from the polymerization will vary depending on the polymerization method employed, the initiator and reactants selected, etc. but will generally be in the range from about 40° C. to 150° C. The novel copolymers of the present invention are viscous materials and generally have a nitrogen content of about 0.1 to 7%, preferably about 0.1 to 4% and a kinematic viscosity at 100° C. of about 100 to 3000 centistokes, preferably 500 to 1500 centistokes.

The copolymer additives used in preparing the lubricating compositions of this invention can be incorporated in the lubricating oils by simply blending with stirring at ordinary temperature or, if desired, a mixture of the oil and the copolymer additive can be heated to elevated temperatures, e.g. 100–130° C. with agitation. The copolymer additive is incorporated in the oil in minor amounts sufficient to provide the oil with improved dispersing and sludge suspending characteristics. Generally the amount will be in the range of about 0.1 to 20% by weight and usually a concentration of about 1 to 10% by weight will be sufficient.

The mineral base oil used in the compositions of the present invention is of lubricating viscosity and can be a solvent extracted or solvent refined oil obtained in accordance with conventional methods of solvent refining lubricating oils. Generally lubricating oils have lubricating viscosities from about 35 to 250 SUS at 210° F. The base oil can be derived from paraffinic, naphthenic, asphaltic or mixed base crudes. In addition to the novel copolymer additives of the present invention the base oil may contain conventional modifiers which impart other desirable characteristics to the oils, e.g. corrosion inhibitors, antioxidants and the like.

The following example is included to further describe the invention:

EXAMPLE

N-ethyl piperazine methacrylate was prepared as follows:

130 g. hydroxyethyl piperazine, 400 g. xylene, 0.4 g. hydroquinone and 0.6 g. sodium acid sulfate were charged to a 1-liter 4-neck flask. 86 g. methacrylic acid was slowly added to the reaction flask while stirring the reaction mixture at room temperature during a 1-hour period of time. The reaction mixture was stirred and heated at reflux temperature while water of reaction was collected in a Dean-Stark trap below the reflux condenser. After stirring at reflux for 12 hours at 136–140° C. 17.5 cc. water was collected. The product was topped to 140° C. at 15 mm. Hg. to leave 186 g. of liquid residue which contained 13.52% N, vs. 14.2% N calculated for N-ethyl piperazine methacrylate.

Lauryl methacrylate and the N-ethyl piperazine methacrylate at a ratio of 85:15 were polymerized in the presence of 2 percent by weight of decyl aldehyde employing the following solution polymerization method:

50 g. benzene, 42.5 g. lauryl methacrylate, 7.5 g. N-ethyl piperazine methacrylate and 1 g. $C_{10}$ aldehyde were charged to a 200 cc. 1-neck flask. The monomer was mixed until a clear solution resulted. 0.25 g. $\alpha,\alpha$-azodi-iso-butyronitrile polymerization catalyst was added and the reaction mixture was heated at 80° C. under a reflux condenser for 6 hours. The benzene was removed by distillation under vacuum to leave a viscous product having a nitrogen content of about 2.1%.

Lauryl methacrylate and N-ethyl piperazine at a ratio of 98:2 was polymerized in absence of aldehyde by the following bulk polymerization process:

49 g. lauryl methacrylate and 1 g. N-ethyl piperazine methacrylate were charged to a 200 cc. 1-neck flask and heated to 60° C. while mixing by bubbling a stream of nitrogen through the monomer mixture. When a clear solution was obtained, 0.25 g. $\alpha,\alpha$-azodi-iso-butyronitrile polymerization catalyst was added and a small nitrogen stream was kept passing through the mixture for 4 hours at 80–100° C. A viscous liquid product having a K.V. at 100° C. of 828.2 cc. resulted.

Copolymers of lauryl methacrylate and N-ethyl piperazine methacrylate at various other ratios were also prepared either by the bulk or solution methods and either in the presence or absence of decyl aldehyde. The polymers prepared are shown in Table I below.

Each of the polymers was added in a concentration of 5% by weight to a Mid-Continent neutral oil having a viscosity SUS at 100° F. of 160 and a viscosity index of 95 and the compositions containing a soluble polymer were subjected to a detergency test. At the end of the test the oil is rated visually for cleanliness, the deposited sludge is weighed and pentane insolubles and viscosity index determined. The results of the tests are shown in Table I below. In the table, column (1) gives the visual rating. Column (2) gives the weight of oil-less sludge adhering to the test container after hexane washing. Column (3) gives pentane insolubles which are an indication of the weight of sludge peptized. Column (4) gives the viscosity index of the oil composition.

TABLE I

| Wt. Ratio of Monomers LM:N-EPM:ALD | Nitrogen Content, Percent | Polymerization Procedure | Polymer Conc., Percent | Detergency Test Results | | | |
|---|---|---|---|---|---|---|---|
| | | | | (1) Rating | (2) Sludge Wt., Gms. | (3) Pentane Insol., Percent | (4) Oil V.I. |
| 100:0:0 | | Bulk | 5 | 53 | 0.70 | 0.105 | |
| 75:25:0 | 3.4 | do | | | | | |
| 80:20:0 | | do | | | Insoluble. | | |
| 85:15:0 | | do | | | | | |
| 90:10:0 | | do | 5 | 95 | 0.03 | 0.261 | 144 |
| 95:5:0 | | do | 5 | 98 | 0.04 | 0.210 | 143 |
| 98:2:0 | | do | 5 | 90 | 0.12 | 0.408 | 143 |
| 99:1:0 | 0.14 | do | 5 | 99 | 0.01 | 0.251 | 147 |
| 85:15:2 | 2.1 | Solution | 5 | 99 | 0.01 | 0.183 | 138 |
| 90:10:2 | 1.4 | do | 5 | 96 | 0.06 | 0.292 | 133 |
| 100:2 | | do | | | | | |

LM=laurylmethacrylate.
N-EPM=N-ethyl piperazine methacrylate.
ALD=decyl aldehyde.

Examination of the data shows the copolymers of lauryl methacrylate and N-ethyl piperazine methacrylate of the present invention are highly effective dispersants in mineral oils. The data also shows that copolymers of lauryl methacrylate and N-ethyl piperazine prepared at ratios of 75:25 to 90:10 were insoluble in the lubricating oil. When the monomers within these ratios are polymerized in the presence of the aldehyde, however, the resulting copolymer was soluble in the oil and produced results even better than those obtained by copolymers prepared by use of concentrations of N-ethyl piperazine low enough to render the copolymer soluble in the oil.

We claim:

1. An oil-soluble copolymer of an ester of an alkanol of about 10 to 20 carbon atoms and acrylic acid and an N-alkyl piperazine ester of acrylic acid, said alkyl group being a lower alkyl group, said copolymer having the ester of acrylic acid and the N-alkyl piperazine ester in a mol ratio of about 75:25 to 99:1 and a nitrogen content of about 0.1 to 7%.

2. An oil-soluble copolymer as in claim 1 wherein the ester of acrylic acid is lauryl methacrylate and the N-alkyl piperazine ester is N-ethyl piperazine methacrylate.

3. An oil-soluble polymer as in claim 1 prepared in the presence of about .5 to 10% by weight of a $C_2$–$C_{20}$ alkanal.

4. An oil-soluble polymer as in claim 3 wherein the ester of acrylic acid and alkyl piperazine ester is in a mol ratio of about 75:25 to 92:8.

5. The composition consisting essentially of a mineral oil of lubricating viscosity having incorporated therein about .1 to 20% by weight of an oil-soluble copolymer of an ester of an alkanol of about 10 to 20 carbon atoms and acrylic acid and an N-alkyl piperazine ester of acrylic acid, said alkyl group being a lower alkyl group, said copolymer having the ester of acrylic acid and the N-alkyl piperazine ester in a mol ratio of about 75:25 to 99:1 and a nitrogen content of about 0.1 to 7%.

6. The composition of claim 5 wherein the ester of acrylic acid is lauryl methacrylate and the N-alkyl piperazine ester is N-ethyl piperazine methacrylate.

7. The composition of claim 5 wherein the oil-soluble copolymer has the ester of acrylic acid and alkyl piperazine ester in a mol ratio of about 75:25 to 92:8.

8. The composition of claim 5 wherein the copolymer is prepared in the presence of about .5 to 10% by weight of a $C_2$ to $C_{20}$ alkanal.

9. An oil soluble copolymer of an ester of an alkanol of about 10 to 20 carbon atoms and methacrylic acid and a N-alkyl piperazine ester of methacrylic acid, said alkyl group being a lower alkyl group, said copolymer having the ester of methacrylic acid and the N-alkyl piperazine ester in a mole ratio of about 75:25 to 99:1 and a nitrogen content of about 0.1 to 7%.

10. The composition consisting essentially of a mineral oil of lubricating viscosity having incorporated therein about .1 to 20% by weight of an oil-soluble copolymer of an ester of methacrylic acid and an alkanol of about 10 to 20 carbon atoms and an N-alkyl piperazine ester of methacrylic acid, said alkyl group being a lower alkyl group, said copolymer having the ester of methacrylic acid and the N-alkyl piperazine ester in a mol ratio of about 75:25 to 99:1 and a nitrogen content of about 0.1 to 7%.

References Cited in the file of this patent

UNITED STATES PATENTS

| | | |
|---|---|---|
| 2,737,496 | Catlin | Mar. 6, 1956 |
| 2,800,452 | Bondi et al. | July 23, 1957 |
| 2,816,882 | Schiller | Dec. 17, 1957 |
| 2,889,282 | Lorensen et al. | June 2, 1959 |
| 2,949,445 | Blake | Aug. 16, 1960 |
| 3,024,195 | Drummond et al. | Mar. 6, 1962 |
| 3,030,303 | Ryan | Apr. 17, 1962 |

OTHER REFERENCES

Biswell et al.: "A New Class of Polymeric Dispersants for Hydrocarbon Systems." Paper delivered at 125th National Meeting, ACS, March 23 to April 1, 1954. Reprint published by Du Pont; 7 pages.